April 12, 1949.　　　　　G. E. WHITE　　　　　2,466,756
CONSTANT SPEED DEVICE
Filed Dec. 4, 1943
*Fig. 1.*
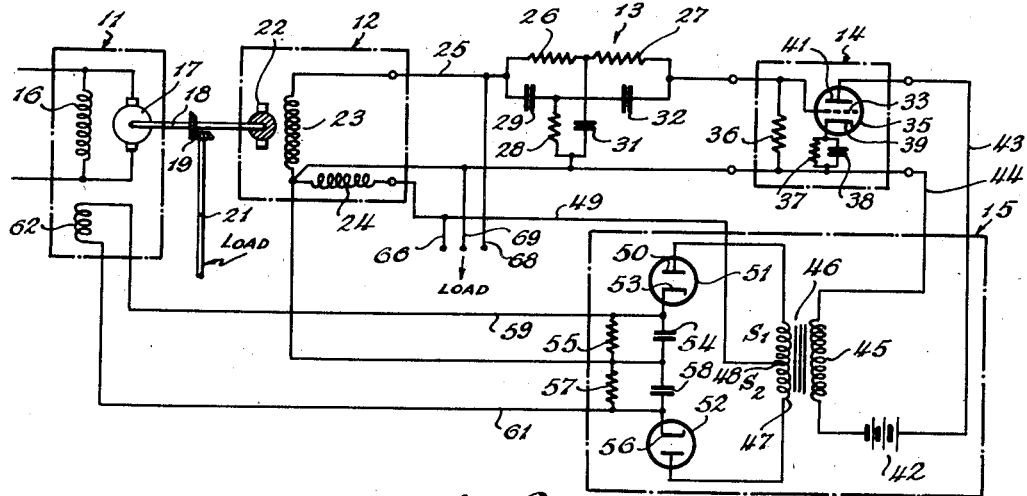
*Fig. 2.*
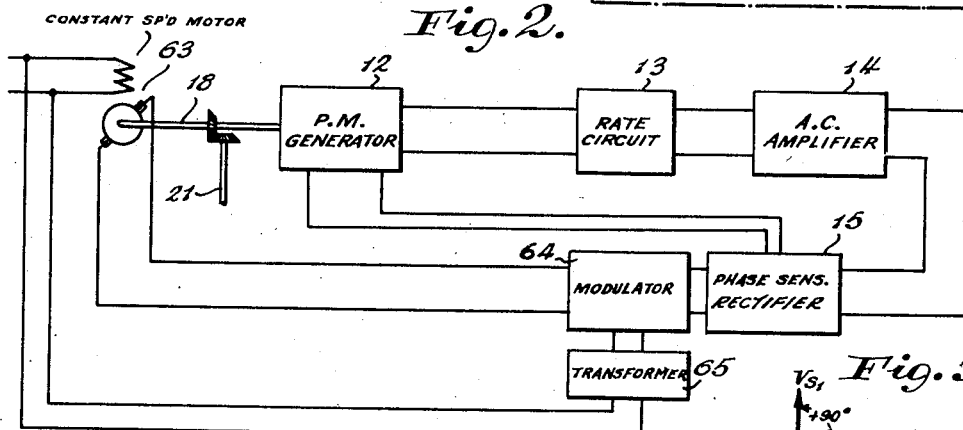
*Fig. 3ª.*
*Fig. 3ᵇ.*
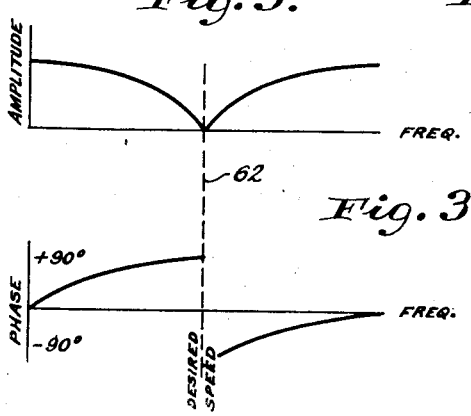
*Fig. 4.*
*Fig. 5.*
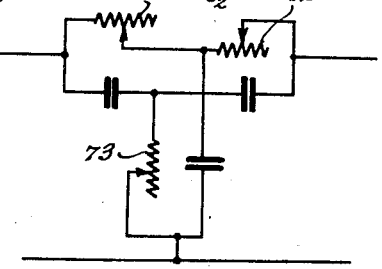
INVENTOR
GIFFORD E. WHITE
BY Paul B. Hunter
ATTORNEY Patented Apr. 12, 1949

2,466,756

UNITED STATES PATENT OFFICE 2,466,756

CONSTANT SPEED DEVICE

Gifford E. White, West Hempstead, N. Y., assignor to The Sperry Corporation, a corporation of Delaware Application December 4, 1943, Serial No. 512,858

12 Claims. (Cl. 318—312)

My invention relates to constant speed devices and is concerned primarily with improvements in electronic speed control circuits.

It has been proposed previously in constant speed devices to control the speed of an electric motor by passing a voltage through a control field winding therein, the characteristics of the voltage being dependent upon the speed of the motor and being variable about a reference corresponding to the desired speed.

One method of producing this control voltage has involved the generation of a voltage whose frequency is a function of the speed of the motor and the passing of this voltage through a frequency-sensitive circuit tuned to a frequency which corresponds to a maximum predetermined motor speed. Then, as the motor which is usually of the shunt wound type approaches this maximum speed, the generator voltage approaches the critical frequency of the tuned circuit, is passed through it and delivered to a control field winding in the motor which reduces the motor speed. As the motor's speed is reduced, the frequency of the generator voltage is decreased, and the tuned circuit refuses to pass an appreciable current to the control field, thus allowing the speed of the motor to increase. Under this operation, the motor is continuously "hunting" the speed determined by the frequency of the generated voltage which passes the tuned circuit, and the motor speed is maintained substantially constant.

In such a control circuit, if the output of the tuned circuit can be visualized graphically as having its amplitude plotted against its frequency, it will be seen that the voltage will increase as its frequency increases up to the resonant frequency of the tuned circuit and thereafter will decrease as the frequency continues to increase. This rise is not linear, the major increase and decrease occurring immediately before and after the resonant frequency is attained. Thus the output voltage curve will describe a "peak" at the tuned frequency, at which point the maximum voltage will be passed by the tuned circuit for delivery to the control field winding of the motor. Due to certain inherent characteristics of a tuned circuit, such a curve will be rounded at its apex and will not describe a distinct and sharp "break" at the resonant frequency. Further, the output of the tuned circuit is substantially symmetrical about the resonant frequency of the circuit and, accordingly, if control is to be maintained, the generator must be driven at speeds within the limits of the rising portion of the amplitude vs. frequency characteristic. For example, if a motor whose speed is to be maintained at a maximum R. P. M. of 1200 is used to drive the generator, the resonant frequency at which the tuned circuit will pass current may be set at 720 cycles per second to maintain this speed. As the motor is thrown on the line, the output frequency of the generator will increase with the speed of the motor and approach a frequency of 720 cycles at which point the circuit will pass an error voltage that is applied to a control field winding within the shunt motor. This control winding is wound in a sense with respect to the shunt winding of the motor such that the voltage passing the tuned circuit is additive to the field. Due to the characteristic operation of the shunt motor, the speed of the motor is decreased with an increase of field energization. As the speed of the motor falls off the generator which it drives is operated at reduced speed and the frequency of its output is decreased. With a decrease in the frequency of the input voltage impressed on it, the tuned circuit refuses to pass an appreciable amount of current to the field winding, and the speed of the shunt motor is increased to approach its speed maintained prior to the application of the error voltage. In this manner the system, namely, the constant speed motor, the variable frequency generator and the error voltage circuit, "hunts" a constant state which is determined by the resonant frequency of the circuit.

While this mode of operation gives satisfactory speed control within certain limits, the system has inherent disadvantages which are attributable to the use of the tuned circuit. For example, and as stated before, it is impossible to construct a tuned circuit which will give a sharp break in the amplitude vs. frequency curve at the resonant frequency of the circuit. This, of course, makes its use ineffective for minute speed changes occurring before the frequency of the input voltage to the tuned circuit reaches that of resonant frequency. Moreover, since the amplitude vs. frequency curve is substantially symmetrical about the resonant frequency, it is necessary that the circuit's operation be accomplished within the limits of frequency variation determined by that part of the rising portion of the curve wherein the voltage increases linearly with the frequency. Further, it is impossible to design a tuned circuit so that the envelope of its output will be a derivative of the envelope of its input.

To increase the efficiency of control and to make the control circuit responsive to the time rate of change of the velocity of the controlled device, I propose to employ a control circuit which will produce an error voltage having sharp differentiation at the resonant frequency or critical frequency and which will deliver an output voltage whose envelope is a derivative of the envelope of the input voltage, thereby making the control circuit sensitive to changes in the time rate of change of speed.

Accordingly, it is an object of my invention to provide a control device in which the speed of the controllable device is maintained substantially constant as a function of the time rate of change of its speed.

It is also an object of my invention to provide a speed control device in which the speed of the controllable speed device may be selectively changed and maintained substantially constant at the selected speed.

Another object of my invention resides in the novel features of a constant speed control device which may be operated as a constant speed motor, as a constant voltage generator, or as a constant frequency device.

A further object of my invention is to employ non-resonant null type of network such as a parallel-T resistance-reactance network in the error voltage circuit of a constant speed control device in such a manner that the controllable speed device will be responsive to its acceleration.

Still another object of my invention is to provide a constant speed device in which a shunt wound motor is employed to drive a generating means whose output both as to frequency and amplitude is a function of the speed at which it is driven and to pass the output of the voltage generator through a control circuit in such a manner that no current will be supplied to the control field winding of the motor while it is operating at a selected and predetermined speed but which will pass voltages to the control winding in phase opposition with each other depending upon whether they are above or below the circuit's frequency corresponding to the selected speed of the motor.

Yet another object of my invention is to provide a constant speed device in which a repulsion-type motor, equipped with commutator brushes to receive voltages other than induced voltages, is used to drive a generator whose output both as to frequency and amplitude is a fuction of the speed of the motor, and to convert the output of the generator by means of a phase-sensitive circuit into an error voltage for application to the rotor winding of the repulsion motor in such a manner that the speed of the motor will be controlled as a function of its acceleration about a predetermined speed which is determined by the null frequency of a parallel-T resistance-reactance network inserted in the error voltage circuit.

Other objects and advantages of my invention will become apparent as the description proceeds.

In carrying out my invention in a preferred embodiment thereof, I employ a shunt wound motor which is equipped with a control field winding, so located with respect to its field winding that an error voltage may be applied to aid or buck the magnetizing force due to the field winding. This motor is used to drive a generator whose output, both as to frequency and amplitude, is a function of the speed at which it is driven and, incidentally, the speed of the motor, and which is preferably capable of delivering two-phase power. One phase of the output of this generator is passed through a parallel-T resistance-reactance network which passes a voltage of decreasing amplitude with an increase in frequency of input to a point where no voltage is passed and which thereafter passes a voltage of increasing amplitude with increased frequency. The output of this network is amplified and fed to the primary winding of a transformer whose secondary is split to receive the second phase of the output of the generator and which combines it therewith to pass the same through a phase-sensitive rectifier. In the latter circuit an error voltage is generated which is applied to the control field winding of the shunt wound motor to add to or subtract from the magnetizing force due to the normal field current therein to effect change in motor speed.

A more comprehensive understanding of my invention will be afforded from the following detailed description when considered in conjunction with the accompanying drawing, in which Fig. 1 is a circuit diagram of a constant speed device which embodies my invention;

Fig. 2 is a modification of the circuit shown in Fig. 1, adaptable to alternating current application;

Figs. 3a and 3b are, respectively, amplitude vs. frequency and phase vs. frequency diagrams of the output of the parallel-T resistance-reactance network used in the error voltage branch of the control circuit;

Fig. 4 a diagram of a modified form of a parallel-T resistance-reactance network which illustrates the use of adjustable constants; and Fig. 5 is a vector diagram of the voltages in the secondary winding of the transformer illustrated in Fig. 1.

Like reference numerals have been used throughout in the drawing to designate like parts.

In the embodiment of my invention illustrated in Fig. 1, I employ a shunt-wound motor 11 which is used to drive a permanent magnet generator 12 to which a voltage load may be connected as shown. One phase of the two phase output of permanent magnet generator 12 is delivered to a parallel-T resistance-reactance network 13 which, in the manner later to be described, passes no voltage at a predetermined frequency and which passes voltages in phase opposition with each other at frequencies above or below the null frequency of the circuit. The output of parallel-T resistance-reactance network 13, when the same is passing voltage, is amplified in the amplifier 14 and delivered to a phase-sensitive rectifier 15, which produces an error voltage whose magnetizing effect is additive or subtractive with respect to that due to the field current of motor 11, thereby effecting speed control of the latter.

As illustrated, the shunt-wound motor 11 has a field winding 16 and a rotor 17. It delivers a torque through the shaft 18 and gears 19 to shaft 21, from which point it may be taken to drive a load. Shaft 18 also drives rotor 22 of permanent magnet generator 12, which is illustrated as having two windings 23 and 24 for generating two-phase power. The output of one phase of permanent magnet generator 12 is delivered over a line 25 to a parallel-T resistance-reactance network 13 comprising a bilateral circuit means made up of resistors 26, 27 and 28 and capacitors 29, 31 and 32, as shown. The output of this network is fed to the control grid 33 of the amplifier 14, which is illustrated as a triode 35. Amplifier 14 is provided with the usual grid-leak resistor 36 and the self-biasing elements comprising the resistor 37 and capacitor 38 which are connected in the circuit of cathode 39. Plate 41 receives positive energy from B+ source 42. The output of amplifier 14 is delivered over the lines 43 and 44 to the primary winding 45 of a transformer 46. The secondary winding 47 of transformer 46 is provided with a center tap 48 which receives the output of the second phase of permanent magnet generator 12 over a line 49. A phase-sensitive rectifier comprising the thermionic elements 51 and 52, which are illustrated as diodes, receives the output of the secondary winding 47 of transformer 46. Element 51 has connected in the circuit of its cathode 53 a capacitor 54 and resistor 55 which act as a filter for the output of this element. In a similar manner the cathode 56 of element 52 is provided with a filter comprising the resistor 57 and capacitor 58. The output of the phase-sensitive rectifier 15 is delivered over lines 59 and 61 to a control field winding 62 in the shunt motor 11. Winding 62 is wound with respect to the field winding 16 in such manner that the magnetizing force due to the output of the phase-sensitive rectifier is added to or subtracted from that due to the current flowing in the winding 16. The operation of the circuit as described is dependent primarily upon the characteristics of the parallel-T resistance-reactance network 13, whose amplitude vs. frequency and phase vs. frequency characteristics are illustrated in Figs. 3a and 3b, respectively. Fig. 3a shows that the voltage output vs. frequency input characteristic of this network is inverted as compared to the usual peaked characteristic curve of tuned circuits. Hence this curve may be characterized as being of an inverted, V-shape.

By examination of these curves, it will be noted that at the critical or null frequency of the network, which is indicated by the dotted line 62 running through the two figures, the circuit passes no voltage. It will be observed further that for an increase in frequency, the voltage output of the circuit decreases from a maximum to zero at the null frequency of the circuit, and that thereafter with a continued increase in frequency, the output increases to maximum. It will be seen further that for outputs which correspond to frequencies which are less than the null frequency of the circuit, the maximum is increased to a phase of +90°; and for outputs corresponding frequencies in excess of the null frequency of the circuit, the phase decreases from the −90° value and becomes asymptotic to the zero phase coordinate. Constructional and operational details of this branch of the circuit are fully described in a copending application entitled Rate circuits, filed by Gifford E. White and Morris Relson on December 30, 1941 and bearing U. S. Serial No. 425,002, which application is now Patent No. 2,446,567, issued August 10, 1948. To meet the requirements of the present application, however, only the following particulars are necessary. The circuit is symmetrical, the two series resistors 26 and 27 are equal and the two series capacitors 29 and 32 are also equal, the resistances and capacitances being substantially of the same magnitude. Further, the network is normally designed so that its direct current output is equal to its high frequency output for a given load. With these conditions imposed, the series parameters may be fixed and the values of resistor 28 and capacitor 31 determined experimentally to balance the circuit at the desired null frequency.

The permanent magnet generator 12, which is connected directly to motor 11, generates a two-phase voltage whose frequency and amplitude are proportional to the speed at which it is driven, or the speed of motor 11. One phase of this voltage is impressed on the parallel-T resistance-reactance network 13, and for the null frequency of this circuit, no voltage is passed by the amplifier 14 making the speed of motor 11 dependent solely upon the current flowing through the field winding 16 thereof.

With speeds of motor 11 which are less or greater than that required to deliver a voltage to the parallel-T resistance-reactance network 13 at a frequency corresponding to the null frequency of the circuit, voltages are passed by this network which are amplified in amplifier 14 and delivered to the primary winding 45 of the transformer 46. It is to be pointed out here that any voltages passed by network 13 and amplified in amplifier 14 are shifted in phase by +90° or −90° depending upon whether the frequency of the input is respectively less than or greater than the null frequency of the network.

The output of the second phase of permanent magnet generator 12, which is delivered to the center tap 48 of secondary winding 47, divides at this point and passes through the winding in a manner such that the output of amplifier 14 is additive in one sense and subtractive in the other to either half of the split phase voltage, depending on the phase of the output of network 13. Thus, for frequencies below the null frequency of circuit 13, a voltage is passed therefrom to amplifier 14 which is shifted in phase by +90° with respect to the output of the permanent magnet generator delivered to the network. Since the voltages delivered to tap 48 and to network 13 were generated in a two-phase generator, they were initially at 90° phase angle with respect to each other. Thus if the voltages at point 48 in the secondary winding of transformer 46 be represented vectorially as $V_{s1}$ and $V_{s2}$ in Fig. 5, and if it be further assumed that the output of permanent magnet generator 12 which is delivered to parallel-T resistance-reactance network 13 be passed through the primary winding 45 without the effects of network 13, then this voltage could be represented by the vector $V_p$. As previously outlined, however, no such voltage as that represented by $V_p$ can pass the parallel-T resistance-reactance network 13 since any voltage which comes from this circuit is either shifted in phase through +90°, or through −90°. Thus if we assume that, for outputs of network 13 which are produced by frequencies lower than the null frequency of the circuit, the direction of current flow through primary winding 45 of transformer 46 is in a sense, with respect to the drawing, from the top to the bottom of the winding, then a voltage will be induced in the secondary winding 47 of transformer 46, which will cause current flow in a sense from the bottom to the top in the drawing. Since this voltage has been shifted in phase through a positive angle of 90° due to the action of network 13, this voltage will be additive to the voltage $V_{s1}$ flowing in the portion of winding 47 designated $S_1$. During the positive half cycle of this in-phase voltage a positive voltage is thus applied to plate 50 of element 51, thereby causing the same to conduct and to deliver a direct current voltage over line 59 to control winding 62 of motor 11 in such manner that the magnetizing force due to the current carried in winding 62 is subtracted from that due to the current flowing through field winding 16. In this manner the field energization of motor 11 is decreased, which accordingly effects an increase in its speed, and motor 11 is caused to correct its speed toward that determined by the null frequency of network 13.

If, on the other hand, the speed of the motor is increased above that speed which will produce a frequency of the voltage generated in permanent magnet generator 12 corresponding to the null frequency of network 13, a voltage will pass from network 13 to be amplified in amplifier 14 and passed through the primary winding 45 of transformer 46 in a sense which is opposite to that just explained. This voltage acquires its reversal of direction from the characteristic action of network 13 which shifts the phase of a voltage on its input terminal through −90° for a frequency in excess of the null frequency of the circuit. Under such conditions the in-phase voltage induced in secondary winding 47 will be additive to the voltage in that portion of the winding designated $S_2$ and a high positive voltage will be impressed on the anode of element 52 which will render the same conducting to pass a current through the control winding 62 of motor 11 in a direction which will cause the resultant magnetizing force to be additive to that due to the current flowing in field winding 16. With this increase in field energization, the speed of motor 11 will decrease and be corrected toward that which will drive permanent magnet generator 12 at a speed which will maintain the frequency of its output equal to that of the null frequency of network 13.

In this manner voltages are being applied continuously to the control field winding 62 of motor 11 in a sense with respect to the current flow in field winding 16 which will tend to maintain the speed of the motor constant at an R. P. M. necessary to drive permanent magnet generator 12 at such a speed as will produce a voltage having a frequency equal to the null frequency of network 13.

The input voltage applied to network 13 may be thought of as a first modulated carrier wave, in which the carrier wave corresponds in frequency to the mean frequency of the alternating output voltage developed across winding 23, and in which the modulating wave is due to variations in the speed of rotation of rotor 22 of permanent magnet generator 12. Thus the envelope of this first modulated carrier wave is a function of the speed of motor 11. The voltage across winding 24, similarly, comprises a second modulated carrier wave which is in phase quadrature relative to the first wave.

Due to the characteristics of network 13, which are more fully explained in the copending application referred to above, it passes as its output a third modulated wave whose carrier is suppressed and whose envelope is a derivative of the envelope of the input modulated wave. Accordingly, the error voltage passing the phase-sensitive rectifier 15, which acts as a demodulator, is proportional to the rate of change in speed of the motor, thereby making its control responsive to its acceleration. Under such control the motor "anticipates" changes in speed, and the voltages are supplied to control winding 62 which will correct for changes in speed almost before they actually occur. This characteristic of the control circuit renders it more sensitive to variations in speed and enables the motor to maintain its speed substantially constant with imperceptible speed fluctuations.

With reference again directed to Fig. 3a, it is apparent that the error voltages applied to the control winding of motor 11 are substantially of the same magnitude for speeds above or below that desired as the constant speed of the motor. Hence there is no possibility of losing control of the motor as is possible when a tuned circuit is used.

In a modified form illustrated in Fig. 2, the invention is made adaptable to alternating current control. In this modification, the motor 63, which may be of the repulsion type, replaces the shunt-wound motor 11 in Fig. 1. The output of phase-sensitive rectifier 15 is modulated in modulator 64 with a voltage which is first transformed in transformer 65 and which is of line frequency. The output of modulator 64 is delivered to the rotor winding of repulsion motor 63 through the commutator brushes thereof. In all other respects, the circuit illustrated in Fig. 1 is identical with that shown in Fig. 2, and the operation of the circuit is the same.

As illustrated in Fig. 1, it is apparent that the output of generator 12 may be taken therefrom by the leads 66, 68 and 69 for delivery to a load requiring either a constant frequency or a constant amplitude voltage. In this sense the system illustrated is adaptable either as a constant speed motor device, as a constant frequency device, or as a constant voltage generator. The apparatus in Fig. 2 is equally adaptable to such uses.

A further modification of the circuits illustrated in Figs. 1 and 2 may be resorted to for operation where either speed, frequency or voltage is to be maintained at a selectable predetermined value. Such modification of the invention may be had by employing the parallel resistance-reactance network illustrated in Fig. 4 in either of the circuits in place of that illustrated as network 13. It will be noted here that the resistors 26, 27 and 28 of network 13 have been replaced by potentiometers 71, 72 and 73. By the proper adjustment of these potentiometers, it is possible to change the null frequency of the circuit to correspond to any desired predetermined motor speed within the operable range of the network. For example, and in accordance with the method of parameter selection explained above, the resistances of potentiometers 71 and 72 may be varied a like amount and the circuit balanced to the new null frequency by adjustment of potentiometer 73. Increases in resistance lower the null frequency and vice versa. This mode of operation makes the circuit more flexible in its applications by providing a wide range of speeds, frequencies and voltages from which a certain speed, frequency or voltage may be selected by simple circuit adjustments to be maintained constant.

Modifications of my invention are, of course, possible and may present themselves in view of the foregoing disclosure. Accordingly, the illustrations and description herein made are to be considered as illustrative and nowise in a restrictive sense, and my invention both as to spirit and scope is to be limited only by the appended claims.

What is claimed is:

1. In combination with a constant speed motor having a control field winding, a voltage generating means driven by said motor for producing a two-phase voltage, means for passing one phase of said two-phase voltage through a non-resonant null-type derivative-taking network, means for combining the output of said network with the second phase of the output of said generator to produce an error voltage, rectifying means for producing a direct current from said error voltage, and means for applying said direct current to the control field winding of said motor.

2. In combination, a shunt wound motor having a field winding, a control winding within said shunt wound motor so arranged as to apply a control magnetizing force which is additive or subtractive to that due to said field winding, a two-phase permanent magnet generator driven by said shunt wound motor, means including a non-resonant null-type derivative-taking network for receiving one phase of the output of said permanent magnet generator, means for amplifying the output of said network, phase-sensitive rectifying means for combining the output of said amplifying means with the second phase of said permanent magnet generator to produce an error voltage, and means for applying said error voltage to said control winding of said shunt wound motor.

3. In combination, a shunt wound motor having a field winding, a control winding within said shunt wound motor so arranged as to apply a control magnetizing force which is additive or subtractive to that due to said field winding, a two-phase permanent magnet generator driven by said shunt wound motor, means including a non-resonant null-type derivative-taking network for receiving one phase of the output of said permanent magnet generator, means for amplifying the output of said network, phase-sensitive rectifying means for combining the output of said amplifying means with the second phase of said permanent magnet generator to produce an error voltage, and means for applying said error voltage to said control winding of said shunt wound motor.

4. In combination, a repulsion-type electric motor having a rotor for receiving a control voltage, a permanent magnet generator driven by said repulsion-type motor, said permanent magnet generator producing a two-phase voltage, means for applying one phase of said two-phase voltage to a non-resonant null-type derivative-taking network, means for amplifying the output of said network, phase-sensitive rectifying means for combining the output of said amplifying means with the second phase of said permanent magnet generator to produce an error voltage, modulating means responsive to a voltage of line frequency for modulating the output of said phase-sensitive rectifying means, and means for applying the output of said modulating means to said rotor.

5. The method of controlling the speed of a motor which comprises generating first and second modulated waves having different phases and each having an envelope depending upon the speed of said motor, operating on said first modulated wave to produce a third modulated wave having an envelope which is the first derivative of the envelope of said first modulated wave, rectifying said third modulated wave and combining it with said second modulated wave, and utilizing the resultant to vary the energization of said motor.

6. In combination in a motor speed control, means for generating first and second modulated waves having different phases and each having an envelope depending upon the speed of said motor, means for operating on said first modulated wave to produce a third modulated wave having an envelope which is the first derivative of the envelope of said first modulated wave, means for rectifying said third modulated wave and combining it with said second modulated wave, and means for utilizing the resultant to vary the energization of said motor.

7. In a system of the character described, a motor having electrically controlled, motor-speed control means, a generator driven by said motor, means comprising a frequency-sensitive, impedance-reactance network connected to receive the output of said generator, said network being so constructed and arranged as to have an inverted, V-shaped voltage output versus frequency input characteristic curve with the phase of the voltage output reversing when the frequency shifts to opposite sides of the curve apex, phase-sensitive means connected to the output of said network and controlled thereby for supplying a control voltage of a magnitude and polarity sense dependent upon the amplitude and phase sense of the network output, and said control voltage being connected to said motor-speed control means in a manner such as to maintain the motor speed substantially constant.

8. In a system of the character described, a motor having electrically controlled motor-speed control means, generator means driven by said motor for supplying two voltage outputs each having frequencies proportional to the speed of said motor, means comprising a frequency-sensitive, impedance-reactance network connected to receive one of the voltage outputs of said generator, said network being so constructed and arranged as to have an inverted, V-shaped voltage output versus frequency input characteristic curve with the phase of the voltage output reversing when the frequency shifts to opposite sides of the curve apex, phase-sensitive means connected to the output of said network and energized by the other voltage output of said generator for supplying a control voltage of a magnitude and polarity sense dependent upon the amplitude and phase sense of the network output, and said control voltage being connected to said motor-speed control means in a manner such as to maintain the motor speed substantially constant.

9. A system of the character recited in claim 8 in which the two voltage outputs of the generator means are in substantial phase quadrature relation.

10. In a system of the character described, an electric motor having a motor-speed control winding, a source of alternating current connected with said motor, a generator driven by said motor, means comprising a frequency-sensitive, impedance-reactance network connected to receive the output of said generator, said network being so constructed and arranged as to have an inverted, V-shaped voltage output versus frequency input characteristic curve with the phase of the voltage output reversing when the frequency shifts to opposite sides of the curve apex, a phase-sensitive rectifier connected to receive the output of said network and controlled thereby for supplying a unidirectional control voltage having a magnitude and polarity sense dependent upon the amplitude and phase sense of the network output, a modulator connected to receive said unidirectional voltage and energized from said alternating current source for providing an alternating control voltage of the frequency of said source and having a phase sense and amplitude dependent upon the polarity sense and magnitude of the unidirectional control voltage, said alternating control voltage being supplied to the control winding of said motor in such manner as to maintain the motor speed substantially constant.

11. In a system of the character described, an electric motor having a motor-speed control winding, a source of alternating current connected with said motor, a two-phase generator driven thereby for supplying a signal voltage and a reference voltage having the same frequencies, means comprising a frequency-sensitive, impedance-reactance network connected to receive the signal voltage output of said generator, said network being so constructed and arranged as to have an inverted, V-shaped voltage output versus frequency input characteristic curve with the phase of the voltage output reversing when the frequency shifts to opposite sides of the curve apex, phase-sensitive rectifier means connected to receive the output of said network and energized by the reference voltage output of said generator for supplying a unidirectional control voltage having a magnitude and polarity sense dependent upon the amplitude and phase sense of the network output, a modulator connected to receive said unidirectional control voltage and energized from said alternating current source for providing an alternating control voltage of the frequency of said source and having an amplitude and phase sense dependent upon the magnitude and polarity sense of the unidirectional control voltage, said alternating control voltage being supplied to said motor-speed control winding in such manner as to maintain the motor speed substantially constant.

12. A system of the character recited in claim 11 in which the voltage outputs of the two-phase generator are in substantial phase quadrature relation.

GIFFORD E. WHITE.

REFERENCES CITED

The following references are of record in the file of this patent:

UNITED STATES PATENTS

| Number | Name | Date |
| --- | --- | --- |
| 1,647,192 | Nyquist | Nov. 1, 1927 |
| 1,662,083 | Stoller et al. | Mar. 13, 1928 |
| 1,719,491 | Stoller et al. | July 2, 1929 |
| 1,959,161 | Grondahl | May 15, 1934 |